United States Patent [19]
Vincent

[11] Patent Number: 5,444,344
[45] Date of Patent: Aug. 22, 1995

[54] SYSTEM FOR CONTROLLING VARIABLE FREQUENCY DRIVER FOR AC MOTOR INCLUDING SELECTABLE SPEED SIGNALS

[75] Inventor: Irwin Vincent, Beloit, Wis.

[73] Assignee: Beloit Technologies, Inc., Wilmington, Del.

[21] Appl. No.: 116,084

[22] Filed: Sep. 1, 1993

[51] Int. Cl.⁶ .............................. H02P 5/40
[52] U.S. Cl. ...................... 318/599; 318/807
[58] Field of Search .......... 318/6, 7, 599, 626–628, 318/807–811; 388/811–814, 819–824, 827, 831–833, 838–840

[56] References Cited

U.S. PATENT DOCUMENTS

| | | | |
|---|---|---|---|
| 3,777,234 | 12/1973 | Luger | 388/822 |
| 4,063,139 | 12/1977 | Miller | 318/7 X |
| 4,485,337 | 11/1984 | Sandosky | 388/812 |
| 4,491,778 | 1/1985 | Knox et al. | 318/803 |
| 4,712,054 | 12/1987 | Boldt | 318/758 |
| 4,779,183 | 10/1988 | Mutoh et al. | 318/84 X |
| 4,953,053 | 8/1990 | Pratt | 361/31 |
| 4,965,847 | 10/1990 | Jurkowski et al. | 388/814 |
| 5,027,049 | 6/1991 | Pratt et al. | 318/807 |
| 5,077,508 | 12/1991 | Wycoff et al. | 318/436 |
| 5,187,420 | 2/1993 | Kajitani et al. | 318/823 |
| 5,220,266 | 6/1993 | Kobayashi | 318/799 |
| 5,251,681 | 10/1993 | Davenport | 318/561 X |
| 5,267,631 | 11/1993 | Hayashida et al. | 318/594 |
| 5,282,586 | 2/1994 | Suzuki et al. | 318/7 X |
| 5,331,539 | 7/1994 | Pfeifer et al. | 318/599 X |

FOREIGN PATENT DOCUMENTS 0092937 11/1983 European Pat. Off. .

OTHER PUBLICATIONS

Soviet Inventions Illustrated, R section, week A47, issued 1979, Jan. 10, Derwent Publications; & SU-A-587 589 (abstract).

*Primary Examiner*—William M. Shoop, Jr.
*Assistant Examiner*—Brian Sircus
*Attorney, Agent, or Firm*—Dirk J. Veneman; Raymond W. Campbell; David J. Archer

[57] ABSTRACT

In an embodiment, the invention provides a motor control system comprising an adjustable frequency driver coupled between the motor and a power supply, a programmable controller coupled to the driver and operative to control the driver, a set of control signals coupled to the programmable controller, and a set of selectable speed signals coupled to the programmable controller, the programmable controller being programmed to select one of the speed signals and causing same to be transmitted to the driver for controlling the speed of the motor in accordance with the control signals.

15 Claims, 11 Drawing Sheets

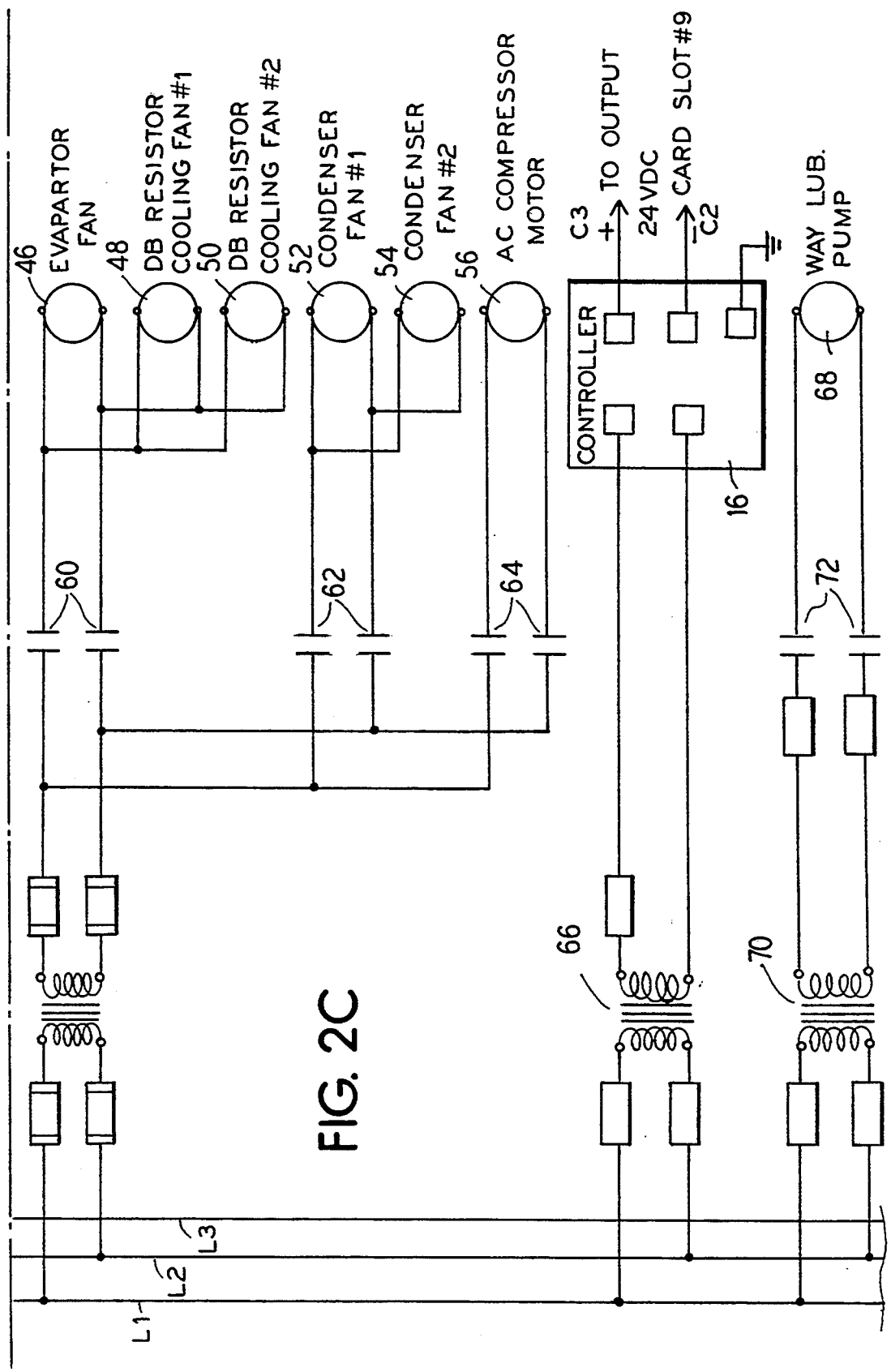

SYSTEM FOR CONTROLLING VARIABLE FREQUENCY DRIVER FOR AC MOTOR INCLUDING SELECTABLE SPEED SIGNALS

BACKGROUND OF THE INVENTION

The present invention generally relates to AC induction motors and controllers therefor. More specifically, the invention relates to drives for such motors. Yet more specifically, the invention relates to variable speed drives for such motors.

Planers are machines used to cut workpieces, and more specifically, to provide flat surfaces thereon. In one application, in the paper making industry, planers are used to cut steel headbox parts and other components for pulp processing machines. Examples of such planers include GRAY planers, CC1160 and CC1170.

These planers have continuously been employed in the paper making industry since the 1950s. As such, the controls therefor date back to the 1950s as well. Yet, the drives therefor are relatively inefficient and subject to relatively quick wear and relatively expensive maintenance. Moreover, motors controlled by these drivers exert variable torque, depending on the speeds at which the motors are driven.

In other applications, it is known to utilize an adjustable frequency motor drive system in which the frequency of the power supply to the motor can be selectively varied and the speed of the motor will follow the varying frequency at a slip speed relative to the frequency. A specific example includes drive systems for hoists. Patent documents relating to such drives include U.S. Pat. Nos. 4,953,053; 4,965,847; 5,027,049; and 5,077,508, the disclosures of which are incorporated herein by reference.

In these patents, there is described an adjustable frequency power supply interposed between a mains switch and the motor to be driven. Sixty hertz supply power is input through the mains switch to the adjustable frequency power supply which in turn provides power to the motor. Additionally, a DC power supply is provided to a controller through a transformer connected across a portion of the input power supply lines. A signal converter is connected between the motor and the adjustable frequency power supply for use in motor rotation direction and speed deviation detection purposes.

An alternating current three-phase power supply is provided to the motor from the adjustable frequency power supply. The rotational direction of the motor is determined by the phase sequence of the three-phase power supply thereto.

The adjustable frequency power supply includes an inverter, a microcomputer and an EPROM all connected together by a bus. Information in digital signal form is transferred between the microcomputer, the EPROM and the inverter on the bus. The microcomputer is also connected to the controller for transmitting information signals directing the control of the microcomputer and the controller and to an overload display. The microcomputer includes a microprocessor, a memory and input and output units.

The EPROM contains a program for controlling the operation of the motor in conjunction with signals received by the microcomputer from the controller, the signal converter, and the inverter. The inverter receives the three-phase 60 hz input power and outputs a three-phase selectively variable frequency output to the motor.

As is known, in the inverter, the three-phase input power is rectified to full wave direct current power and then converted to three-phase alternating current (square wave) power at a constant voltage to frequency ratio and at a frequency which may be controlled by signals from the microcomputer. The phase sequence of the alternating current supply to the motor which controls the direction of rotation of the motor is directed by a signal from the controller to the microcomputer.

SUMMARY OF THE INVENTION

The present invention provides a variable speed or adjustable frequency control system for an AC motor. The invention is particularly suited for driving a machine tool motor.

In an embodiment, the invention provides a motor control system comprising an adjustable frequency driver coupled between the motor and a power supply, a programmable controller coupled to the driver and operative to control the driver, a set of control signals coupled to the programmable controller, and a set of selectable speed signals coupled to the programmable controller, the programmable controller being programmed to select one of the speed signals and causing same to be transmitted to the driver for controlling the speed of the motor in accordance with the control signals.

In an embodiment, the invention provides a planer motor control system comprising an adjustable frequency driver coupled between the planer motor and a power supply, a programmable controller coupled to the driver and operative to control the driver, a set of control signals coupled to the programmable controller, a set of selectable speed signals coupled to the programmable controller, the programmable controller being programmed to select one of the speed signals and causing same to e transmitted to the driver for controlling the speed of the planer motor in accordance with the control signals.

In an embodiment, the invention provides a planer having a motor and a control system therefor comprising an adjustable frequency driver coupled between the motor and a power supply, a programmable controller coupled to the driver and operative to control the driver, a set of control signals coupled to the programmable controller, a set of selectable speed signals coupled to the programmable controller, the programmable controller being programmed to select one of the speed signals and causing same to be transmitted to the driver for controlling the speed of the motor in accordance with the control signals.

These and other features of the invention are set forth in greater detail in the following detailed description of the presently preferred embodiments and accompanying drawings.

BRIEF DESCRIPTION OF THE DRAWINGS

FIGS. 2A, 2B and 2C illustrate a schematic diagram of the system of FIG. 1.

DETAILED DESCRIPTION OF THE PRESENTLY PREFERRED EMBODIMENTS

As discussed above, the present invention provides a variable speed control system for a motor, specifically by varying or adjusting the frequency and/or amplitude of a power signal supplied to the motor. An embodiment of such a control system is set forth below as applied to a planer for use in making headbox components for pulp producing machinery. However, the invention is not limited to such a specific application and it is to be understood that the application described herein is for illustrative purposes only. Indeed, the invention has general applicability to AC motors, including machine tool motors.

Figure 1:
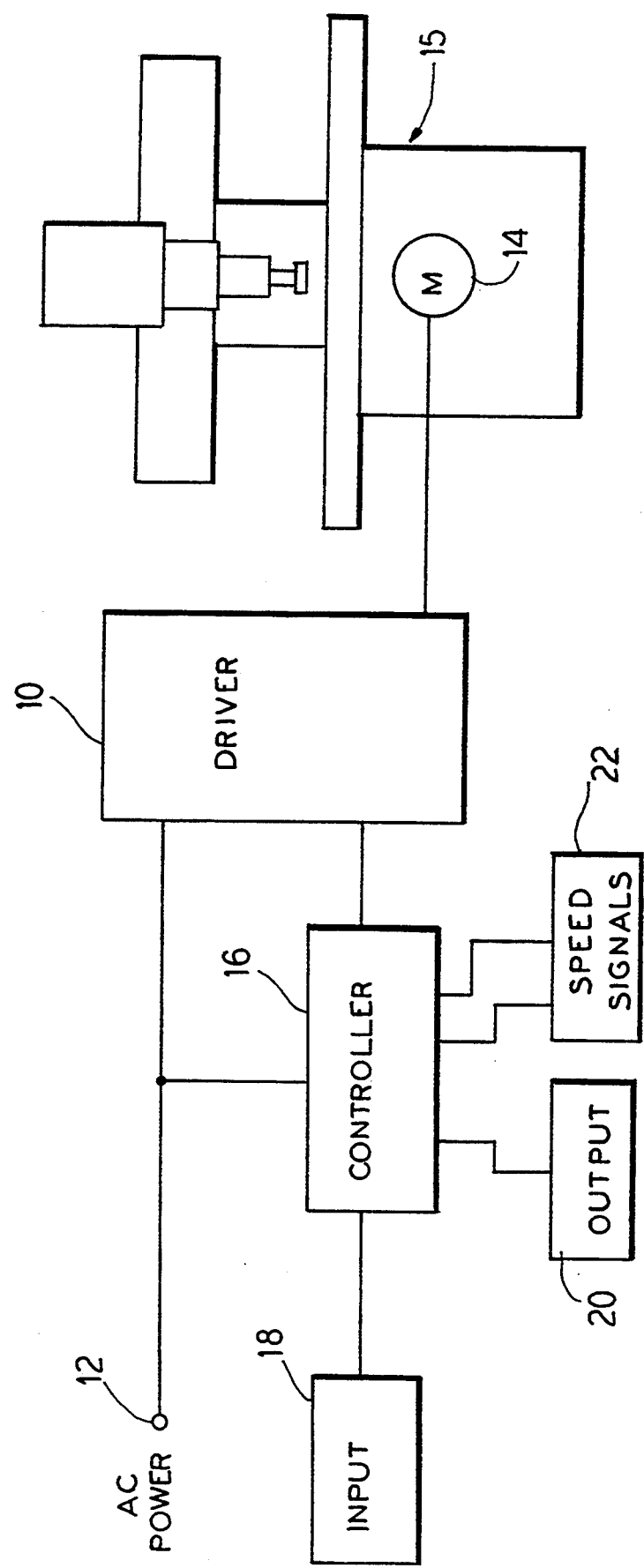
FIG. 1 illustrates a block diagram of a control system for an AC motor embodying principles of the invention.

In FIG. 1, an overall block diagram of a control system embodying principles of the invention is illustrated. As illustrated, an adjustable frequency driver 10 is interposed between a power supply 12 and a motor 14 of a machine tool 15, preferably a planer. The power supply 12 preferably comprises a 60 hz three-phase AC power supply, as is commercially available. The motor 14 preferably comprises a 75 hp three-phase AC induction motor such as that normally employed to drive a planer such as the type CC1160 and CC1170 manufactured by GRAY. The adjustable frequency driver 10 preferably comprises the type manufactured under the designation SMARTORQUE TM by Harnischfeger Corporation. The principles of this driver are detailed in the above identified patents incorporated herein by reference.

As also illustrated, coupled to the variable frequency drive 10 is a programmable controller 16, preferably of the type manufactured under the designation SLC500 by Allen Bradley Company. As will become clearer below, the controller 16 is employed to control the operation of the variable speed driver 10 thereby to control operation of the motor 14.

Coupled to the controller 16 are a plurality of input control signals 18 provided by devices such as on/off switches, limit switches and the like, which are explained more fully below. Additionally, the controller 16 is coupled to a plurality of output control signals 20, which are provided to devices such as indicators (alarms, lights, etc.), solenoids, etc., which are explained more fully below.

Lastly, the controller 16 is coupled to a speed signals board 22. The speed signals board 22 is employed to provide a plurality of selectable speed signals that can be used by the controller 16 to drive the driver 10 to, in turn, drive the motor 14, as required. As will be described more fully below, neither the programmable controller 16 nor the adjustable frequency driver 10 is capable of generating the different speed signals required to drive the motor 14 of a planer at different speeds, for example in a jog mode, slow-down mode, cutting mode and return mode. Therefore, the necessary signals must be separately generated, and in this embodiment they are generated by the speed signals board 22.

As also will become clearer below, the above system when employed in connection with a GRAY planer CC1170, provides a great increase in efficiency over that of the old drive therefor. Further, the motor 14 will exhibit relatively consistent torque at all speeds. It is to be understood that the following description is made within the context of such a GRAY planer CC1170.

With reference now to a schematic diagram illustrated in FIGS. 2A, 2B and 2C, the power wiring of the control system is hereinbelow described.

Figure 2A:
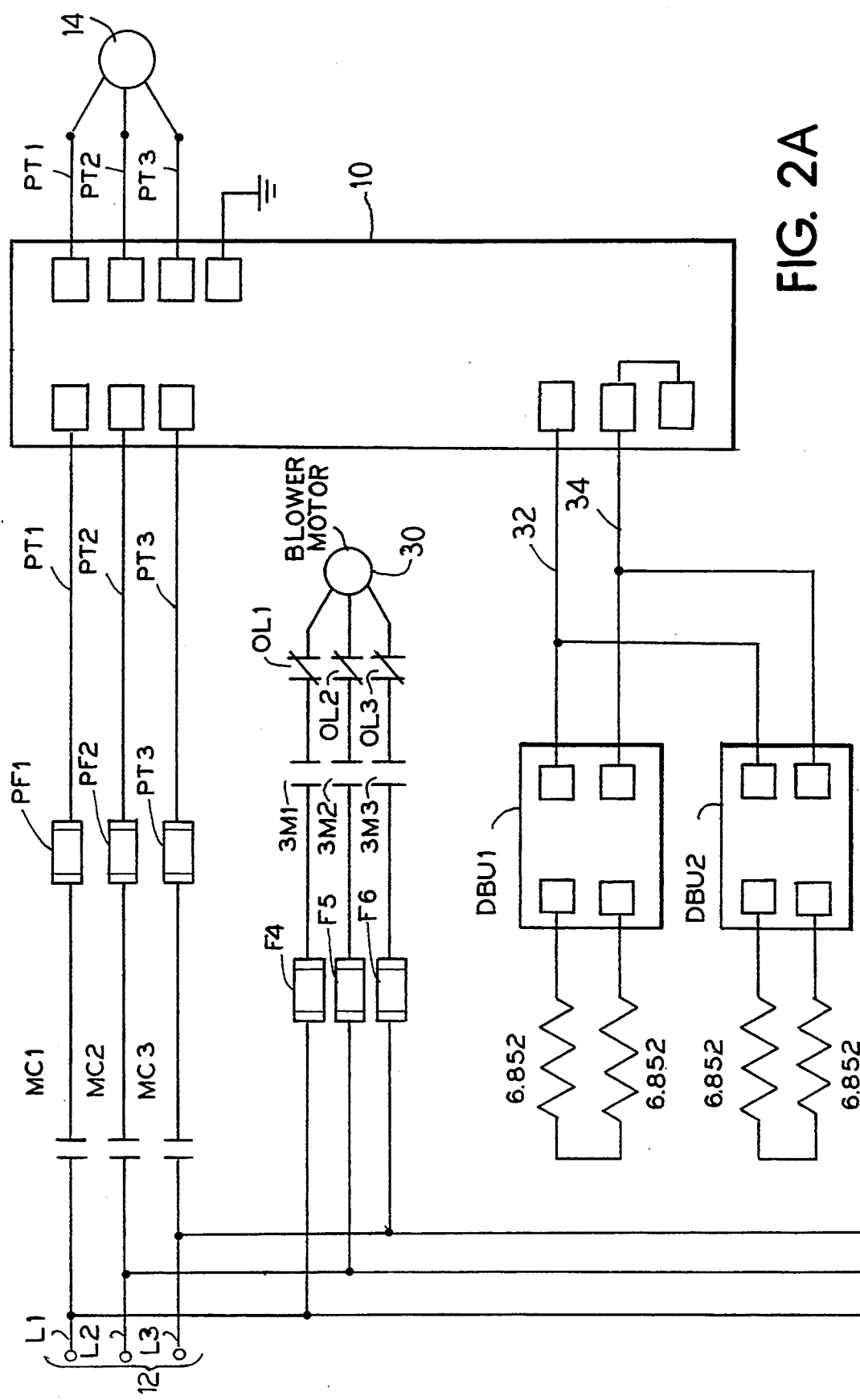

As illustrated in the portion of the schematic provided in FIG. 2A, three-phase, 60 hertz AC incoming power is supplied via power wires L1, L2 and L3. The 60 hertz incoming power is switched directly to the adjustable frequency driver 10 via normally open mains contacts MC1, MC2 and MC3, disposed respectively in lines L1, L2 and L3. Power fuses PF1, PF2 and PF3 are respectively disposed between the normally open mains contacts MC1, MC2 and MC3 and appropriate input terminals of the variable frequency drive 10.

The planer motor 14 then is coupled to the drive 10 via three power wires PT1, PT2 and PT3. The drive 10 supplies a three-phase variable frequency square wave power signal to the motor 14. The phase of the power signal determines the direction the motor 14 will run, i.e., forward or reverse, while the frequency of the power signal determines the speed of the motor 14.

Also coupled to the incoming power lines L1, L2 and L3 is a drive blower motor 30. The drive blower motor 30 is coupled to the power lines L1, L2 and L3 by means of normally open contacts 3M1, 3M2 and 3M3, respectively. This motor 30 is protected from overloading by means of three fuses F4, F5 and F6 as well as three normally closed overload contacts OL1, OL2 and OL3. The drive blower motor 30 preferably is rated at 1 hp.

As the nomenclature implies, the drive blower associated with the motor 30 is employed to cool the drive 10 by blowing air therethrough.

Electrically coupled to the adjustable frequency driver are two braking units DBU1 and DBU2. These braking units are used to stop operation of the planer 15, as is known. These units are coupled in common to a neutral power line output 32 and a hot power line 34 provided by the driver 10. Each braking unit has two 6.8 ohm power limiting resistors appropriately coupled thereto.

Figure 2B:
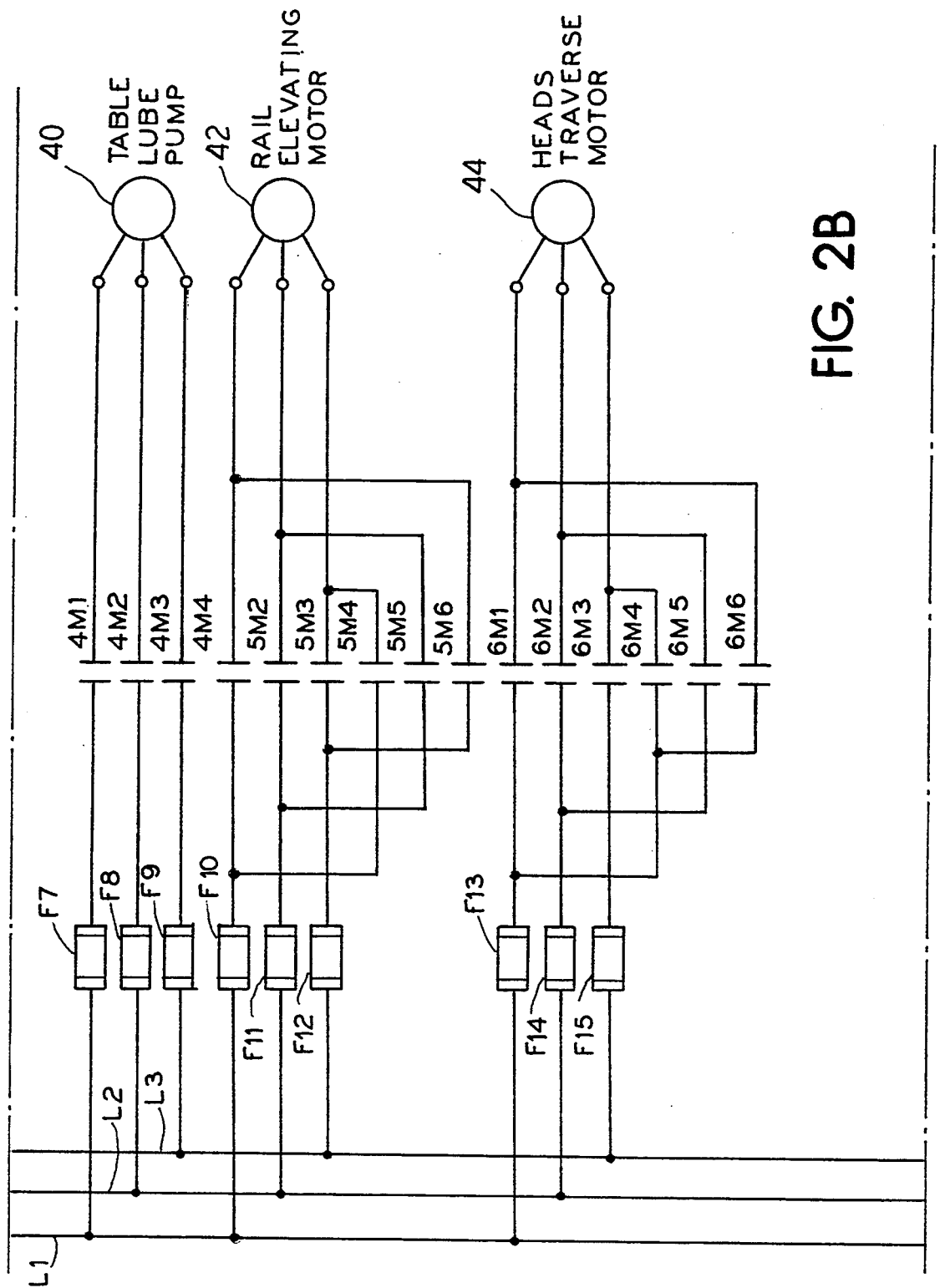

Referring now to the portion of the schematic illustrated in FIG. 2B, it is also illustrated that directly coupled to the incoming 60 hertz AC power are a table lubricating pump 40 (referred to as the table lube pump), a rail elevating motor 42 and a heads traverse motor 44. Each of these is coupled via respective normally open contacts and is protected by suitable fuses. In that regard, the table lubricating pump 40 is coupled to power lines L1, L2 and L3 via normally open contacts 4M1, 4M2 and 4M3 and suitable fuses. The rail elevating motor 42 is coupled to the power lines L1, L2 and L3 via parallel normally open contact pairs 1M1 and 1M2, 1M3 and 1M4, and 1M5 and 1M6 and suitable fuses. The heads traverse motor 44 is coupled to the power lines L1, L2 and L3 via parallel normally open contact pairs 2M1 and 2M2, 2M3 and 2M4, 2M5 and 2M6 and suitable fuses.

The table lubricating pump 40 is employed to pump lubricating fluid on the planer table where needed and as is necessary through appropriate piping. The rail elevating motor 42 is employed to raise and lower rails of the planer, refereed to herein as the left and right rails. The heads traverse motor 44 is employed to move the planer cutting heads along the rails.

In the portion of the schematic illustrated in FIG. 2C, it can be seen that an evaporator fan 46, a drive brake resistor cooling fan 48 associated with drive brake unit DBU1, a drive brake resistor cooling fan 50 associated with drive brake unit DBU2, a first condenser fan 52, a second condenser fan 54 and an AC compressor motor 56 are all coupled to one phase of the incoming 60 hertz power via a transformer 58. The evaporator fan 46, the drive brake resistor cooling fan 48 and the drive brake resistor cooling fan 50 are coupled to the output of the transformer 58 via suitable normally open contacts 60. The condenser fan 52 and condenser fan 54 are coupled to the output of the transformer 58 by another set of normally open contacts 62. The AC compressor motor 56 is also coupled to the output of the transformer 58 via another set of normally open contacts 64.

As also illustrated in FIG. 2C, the controller 16 is coupled to one phase of the power on line L1 and L2 via a transformer 66. Further, among various outputs of the controller 16 are two lines C3 and C2 which provide a 24 volt AC potential between them. As will be explained below, the line C3 is employed to provide a signal source for devices such as limit switches and the like coupled to the controller 16 to provide the various input control signals 18 identified below. The line C2 provides a common ground connection.

A way lubricating pump 68 (referred to as the way lube pump) is coupled to the power lines L1 and L2 via a transformer 70 and normally open contacts 72. The way lubricating pump 68 is employed to pump lubricant onto the ways (rails) (not illustrated) of the planer 15 in a manner not of further concern herein.

Figure 3A:
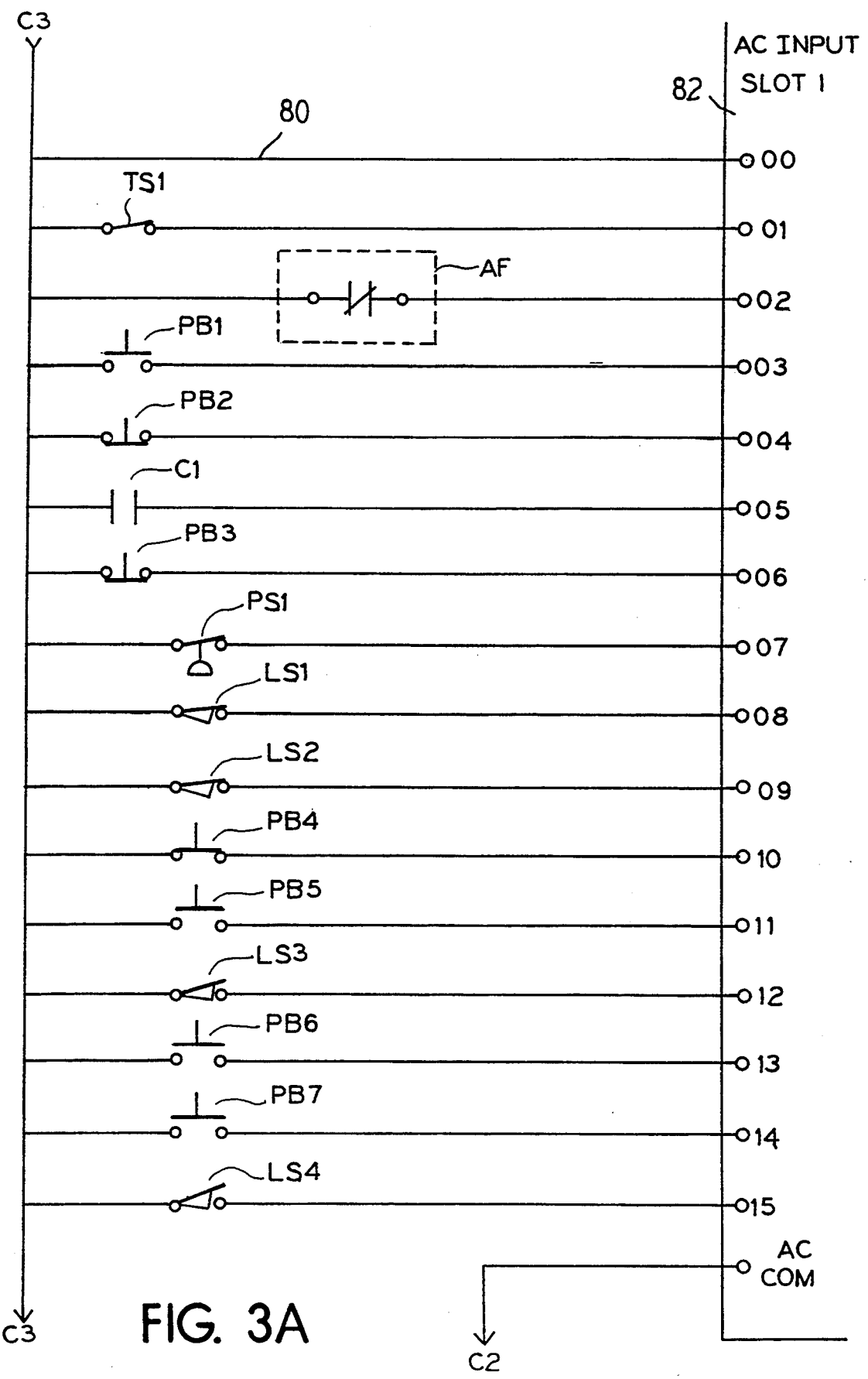
FIGS. 3A, 3B and 3C illustrate control inputs for the programmable controller of FIG. 2.
Figure 3B:
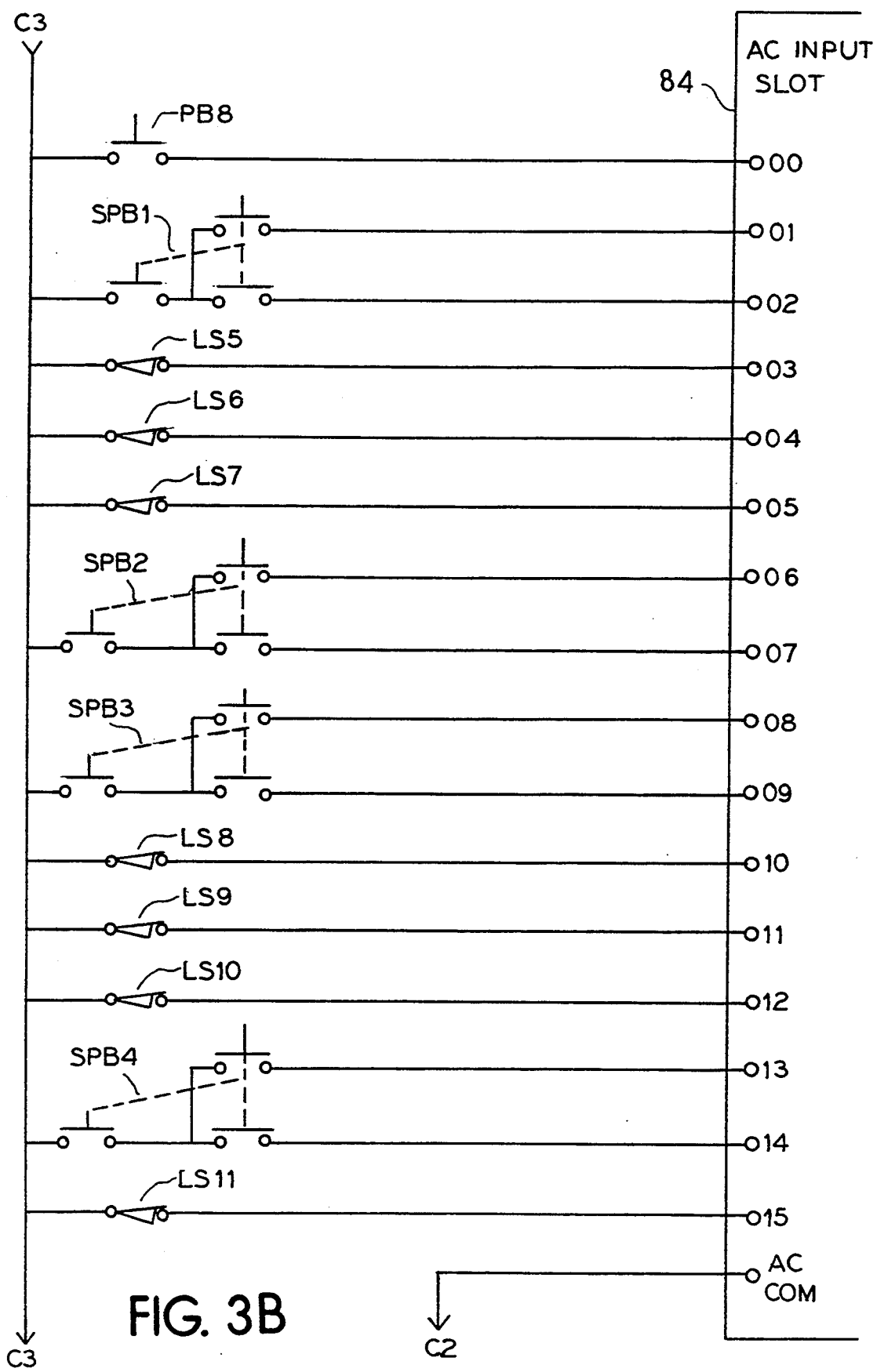
Figure 3C:
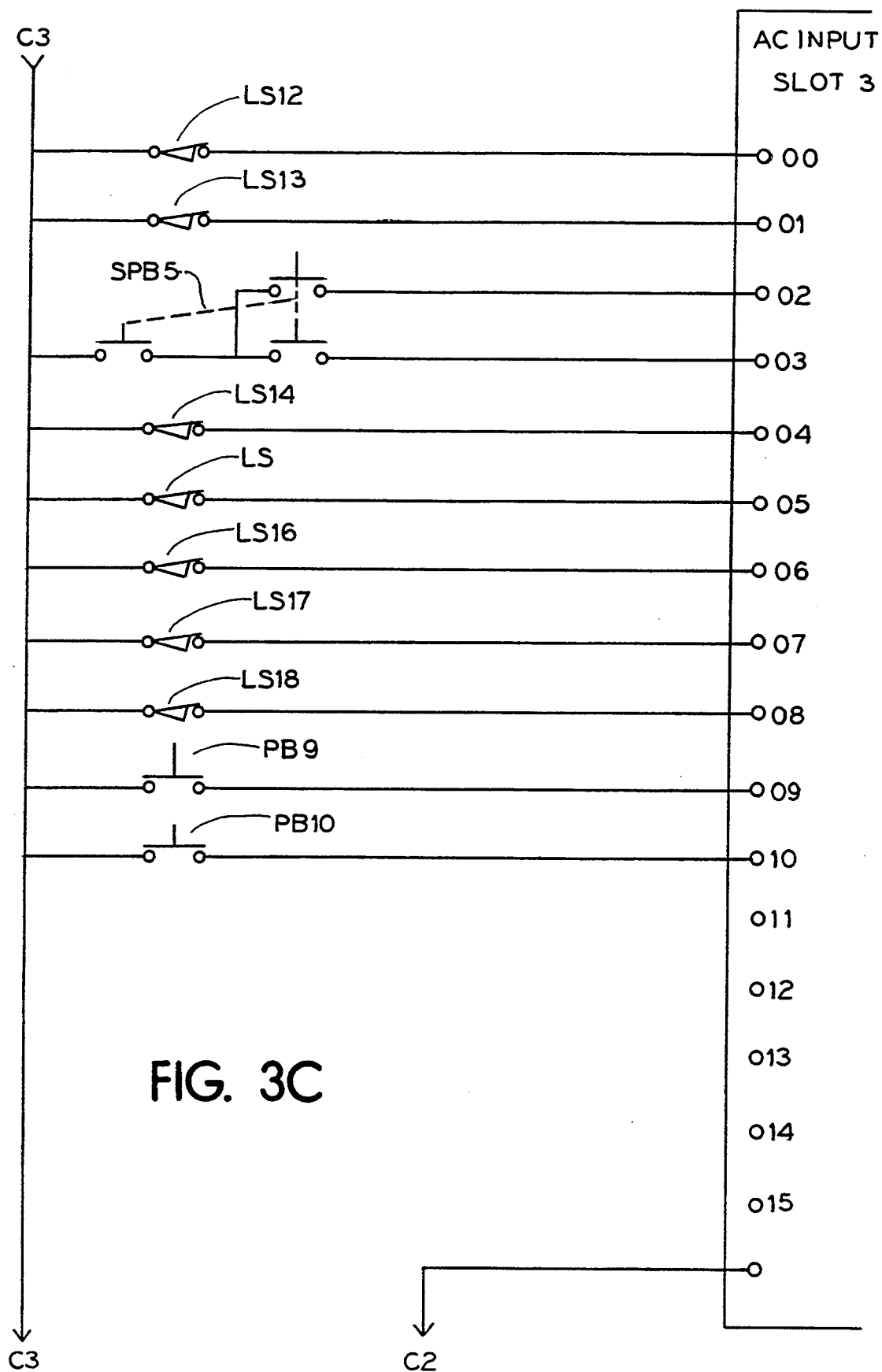

Referring now to FIGS. 3A–3C, the various input control signals 18 and devices producing same coupled to the programmable controller 16 will be described for the illustrated application of the invention.

As can be appreciated, the control system of the illustrated embodiment is constructed such that the interconnections between various components are accommodated within one or more cabinets having electrical interconnection busses. To effect an interconnection, the controller includes various bays or slots into which wiring or circuit boards can be inserted so as to make the necessary interconnections. Herein, these bays or slots are referred to as slots, and are identified by their preferred numerical designation, e.g., slot 6, slot 7, etc.

Further, these slots include individual designations for the various input and output terminals therein, e.g., connections 00, 01, 02, etc. of slot X. These designations are provided in the drawings and are used herein where necessary.

With reference now to FIG. 3A, the connections of various input control signals to slot 1 of the controller 16 are described.

As illustrated in FIG. 3A, the controller 16 is provided with a feedback connection 80 coupled between the 24 volt signal carrying line C3 and an input terminal 00 of slot 1 of the controller 16, so that the controller 16 can monitor the status of the input control signals 18. For example, if no signal is present on the feedback connection 80, then there likely is an open circuit that will prevent all of the input control signals 18 from being processed properly, i.e., no signal on line C3 is output from the controller 16 which will cause the detection of an open or closed circuit at one or more of the other control inputs.

The line C3 is coupled to an output of the controller 16 described below so that the signal carried on the line C3 is generated by the controller 16. With reference to FIG. 2C, it can be seen that this signal is a 24 volt signal.

A second input control signal is an overheat temperature provided by a normally closed control temperature switch TS1 coupled between line C3 and input terminal 01 of slot 1. Should the drive 10 become too warm, the switch TS1 will open and the controller 16 can react accordingly.

A normally closed contact AF coupled between line C3 and input terminal 02 of slot 1 provides an indication as to the operating status of the drive 10. As can be appreciated, when the drive 10 is engaged, the AF contact will open and will provide a suitable indication to the controller 16. However, upon cessation of operation of the drive 10, the contact AF remains in its normally closed state.

A normally open push button PB1 coupled between line C3 and input terminal 03 of slot 1 provides a means by which an operator can command the controller 16 to be placed in an "on" state. As can be appreciated, momentary depression of the push button PB1 will cause the controller 16 to recognize a short circuit input and will then lock the controller 16 into its "on" state until turned "off" or reset as described below.

In that regard, normally closed push button PB2 coupled between line C3 and input terminal 04 of slot 1 provides a means by which an operator can turn the controller 16 "off" or to reset the controller 16. The normally closed push button PB2 upon momentary opening will cause the controller 16 to turn "off" or to restart the program executed therein thereby to reset the system.

A normally open contact C1 coupled between line C3 and input terminal 05 of slot 1 provides an indication as to the status of the mains contacts MC1, MC2 AND MC3. When the contact C1 is closed, the mains contacts MC1, MC2 AND MC3 are considered to be closed and that power is supplied to the drive 10.

A normally closed push button PB3 coupled between line C3 and input terminal 06 of slot 1 provides a means by which an operator can stop operation of the planer table. As can be appreciated, the normally closed switch PB3 will open upon actuation and will cause a brake signal to be received by the controller 16 and the controller 16 will react accordingly to stop operation of the planer 15.

A normally closed pressure switch PS1 coupled between line C3 and input terminal 07 of slot 1 provides a means by which the system can indicate over pressure in the table lubricating pump 40. This normally closed pressure switch PS1 will open when a preselected pressure is exceeded in the lubrication lines for the table and at that point the controller will turn off the table lubricating pump 40.

A normally closed limit switch LS1 coupled between line C3 and input terminal 08 of slot 1 provides an indication as to the extent of travel of the planer cutting heads during an operator monitored cutting operation. The limit switch LS1 opens and provides an overtravel indication signal when the planer cutting heads their limit of travel in the forward direction.

A normally closed limit switch LS2 coupled between line C3 and input terminal 09 of slot 1 provides a similar indication only on the return of the planer cutting heads to their home position. Limit switch LS2 provides an indication as to when the planer cutting heads have overtravelled in the opposite direction, i.e., in returning to their home position.

A push button PB4 coupled between line C3 and input terminal 10 of slot 1 provides a means by which an operator can command the controller 16 to place the planer in a "JOG CUT" mode. Upon depression, this normally open switch PB4 will close and cause the controller 16 to stop the motor 14 such that a workpiece is jogged through a cutting operation.

A push button PB5 coupled between line C3 and input 11 of slot 1 provides a means by which an operator can command the controller to place the system in an "AUTO CUT" mode. Momentary closure of this normally open switch will cause the controller to place the planer 15 in continuous operation such that the various components of the planer 15 are automatically controlled to start and stop as required.

A limit switch LS3 coupled between line C3 and input terminal 12 of slot 1 provides an indication as to the extent of travel of the planer during the AUTO CUT procedure. This normally closed switch will open once the planer reaches a preselected position.

A push button PB6 coupled between line C3 and input terminal 13 of slot 1 provides a means by which an operator can command the controller 16 to enter into a "JOG RETURN" mode. Momentary closure of switch PB6 will cause the controller to place the planer in a JOG RETURN mode. In the JOG RETURN mode, the planer will step through a return travel so that a workpiece can be properly positioned.

A push button PB7 coupled between line C3 and input terminal 14 of slot 1 provides a means by which an operator can command the controller 16 to enter into an "AUTO RETURN" mode. Upon momentary closure of this normally open switch, the controller 16 will cause the planer to automatically return to its home position upon reaching its forward limit of travel.

A limit switch LS4 coupled between line C3 and input 15 of slot 1 provides an indication as to the position of the planer during the AUTO RETURN mode. When the planer reaches its normal home position, the normally closed switch LS4 will open thereby providing an indication to the controller 16 that the planer has returned to its home position.

Also illustrated is the coupling of line C2 to the common or ground terminal COM of slot 1.

With reference now to FIG. 3B, control input signals coupled to slot 2 of the controller 16 are described.

A normally open, momentary close push button PB8 coupled between line C3 and input terminal 00 of slot 2 provides a means by which an operator can command the controller 16 to place the motor 14 in a "SLOW-DOWN" mode. Momentary closure of the push button PB8 will cause the controller 16 to the motor 14 in SLOW-DOWN mode. In a SLOW-DOWN mode, the motor 14 will operate at a slower speed so a workpiece can be more slowly planed.

A set of push buttons SPB1 provides a means by which an operator can enter a command to the controller 16 to cause the controller 16 to adjust the planer rail up or down so that the planer cutting heads will be appropriately positioned with respect to the workpiece. Push button set SPB1 actually comprises three interconnected normally-open, momentary close push buttons coupled between line C3 and input terminals 01 and 02 of slot 2. A common momentary close push button is coupled between the line C3 and both of the other two push buttons. Momentary closure of either of the other two push buttons will also cause the common push button to close. A "RAIL UP" command push button is coupled between the common push button and input terminal 01 of slot 2. Similarly, a "RAIL DOWN" command push button is coupled between the common push button and input terminal 02 of slot 2.

Normally closed limit switches LS5 and LS6 respectively provide indications as to whether the planer rail is unclamped or clamped. It can be appreciated that when the rail becomes unclamped or clamped, respectively, the appropriate normally closed limit switch LS5 or LS6 opens. Limit switch LS5 is coupled between line C3 and input terminal 03 or slot 2. Limit switch LS6 is coupled between line C3 and input terminal 04 of slot 2.

A limit switch LS7 coupled between line C3 and input terminal 05 of slot 2 provides an indication as to whether or not the rail has reached its upper limit of travel. In that regard, the normally closed switch LS7 opens when the rail reaches its upper limit of travel when the RAIL UP command is selected.

A set of push buttons SPB2 is similar in construction to push button set SPB1 but provides a means by which an operator can command the controller 16 to raise or lower the right rail head or to move it to the right or to the left, as the case may be. In that regard, push button set SPB2 includes a common normally open, momentary close push button coupled to line C3. An UP/RIGHT command normally open, momentary close push button is coupled between the common push button and input terminal 06 of slot 2. A DOWN/LEFT command normally open-momentary close push button is coupled between the common push button and input terminal 07 of slot 2. Momentary closure of either of the command push buttons will cause simultaneous closure of the common push button.

A set of push buttons SPB3 similarly provides a means by which an operator can command the controller 16 to raise or lower the left rail head or move it left or right, as the case may be. In that regard, push button set SPB3 includes a common normally open, momentary close push button coupled to line C3. An UP/RIGHT command normally open, momentary close push button is coupled between the common push button and input terminal 08 of slot 2. A DOWN/LEFT command normally open-momentary close push button is coupled between the common push button and input terminal 09 of slot 2. Momentary closure of either of the command push buttons will cause simultaneous closure of the common push button.

A limit switch LS8 coupled between line C3 and input terminal 10 of slot 2 provides an indication as to whether the right and left rail heads have reached their limit of travel toward each other. In that regard, this normally closed switch will open once the right and left rail heads have come together, i.e., when the left head is command to move right and when the right head is commanded to move left.

A normally closed limit switch LS9 coupled between line C3 and input terminal 11 of slot 2 provides an indication as to whether the right and left rail heads have reached their upper or right-most limit of travel. This normally closed switch will open once the rail heads reach their limit in their up/right adjustment.

A limit switch LS10 coupled between line C3 and input terminal 12 of slot 2 provides an indication as to whether or not the rail heads have reached their lower or left-most limit of travel. This normally closed switch will open once the rail heads reach their limit in their down/left adjustment.

A set of push buttons SPB4 is similar in construction to push button sets SPB1, SPB2 and SPB3 and provides a means by which an operator can command the controller 16 to cause the right side cutting head to move up/right or down/left as the case may be. To that end, a common normally open-momentary close push button of the push button set SPB4 is connected to line 3. An UP/RIGHT command normally open-momentary close push button is coupled between the common push button and input 13 of slot 2. A DOWN/LEFT common normally open-momentary close push button is coupled between the common push button and input 14 of slot 2.

As can be appreciated, momentary closure of the UP/RIGHT command push button of push button set SPB4 will cause the common push button to close and the right side head to move upwardly or to the right, as the case may be. Similarly, a momentary closure of the DOWN/LEFT command push button will cause the common push button to close and the right side head to move downward or leftward, as the case may be.

A limit switch LS11 coupled between line C3 and input terminal 15 of slot 2 provides an indication as to whether or not the right side head has reached its upper limit. This normally closed switch will open once the right side head reaches its upper limit of travel.

With reference now to FIG. 3C, the remaining control input signals coupled to slot 3 will be described.

A limit switch LS12 coupled between line C3 and input terminal 00 of slot 3 provides an indication as to whether or not the right side head has reached its upper/right limit. This normally closed switch will open once the right side head reaches its upper or right-most limit of travel.

A limit switch LS13 coupled between line C3 and input terminal 01 of slot 3 provides an indication as to whether or not the right side head has reached its lower/left limit. This normally closed switch will open once the left side head reaches its lower or left-most limit of travel.

Another set of push buttons SPB5 provides a means by which an operator can command the controller 16 to control operation of the left side cutting head of the planer. For that purpose, the push button set SPB5 includes a common normally open, momentary close push button coupled to the line C3. Another UP/RIGHT command normally open, momentary close push button is coupled between the common push button and input terminal 02 of slot 3. A DOWN/LEFT command normally open, momentary close push button is coupled between the common push button and input terminal 03 of slot 3. The common push button, of course, closes simultaneously with the closure of either of the other two push buttons.

A limit switch LS14 coupled between line C3 and input terminal 04 of slot 3 provides an indication as to whether the left side head has reached its upper limit of travel. This normally closed switch will open when the left side head reaches its upper limit of travel.

A limit switch LS15 coupled between line C3 and input terminal 05 of slot 3 provides and indication as to whether the left side head has reached its upper/right limit. This normally closed switch will open when the left cite head reaches its upper/right limit of travel.

A limit switch LS16 coupled between line C3 and input terminal 06 of slot 3 provides and indication as to whether the left side head has reached its lower/left-most limit of travel. This normally closed switch will open when the left side head reaches its lower of left-most limit of travel.

A limit switch LS17 coupled between line C3 and input terminal 07 of slot 3 provides and indication as to whether the right side head has reached its downward limit of travel. This normally closed switch will open when the right side head reaches its lower or left-most limit of travel.

Figure 4A:
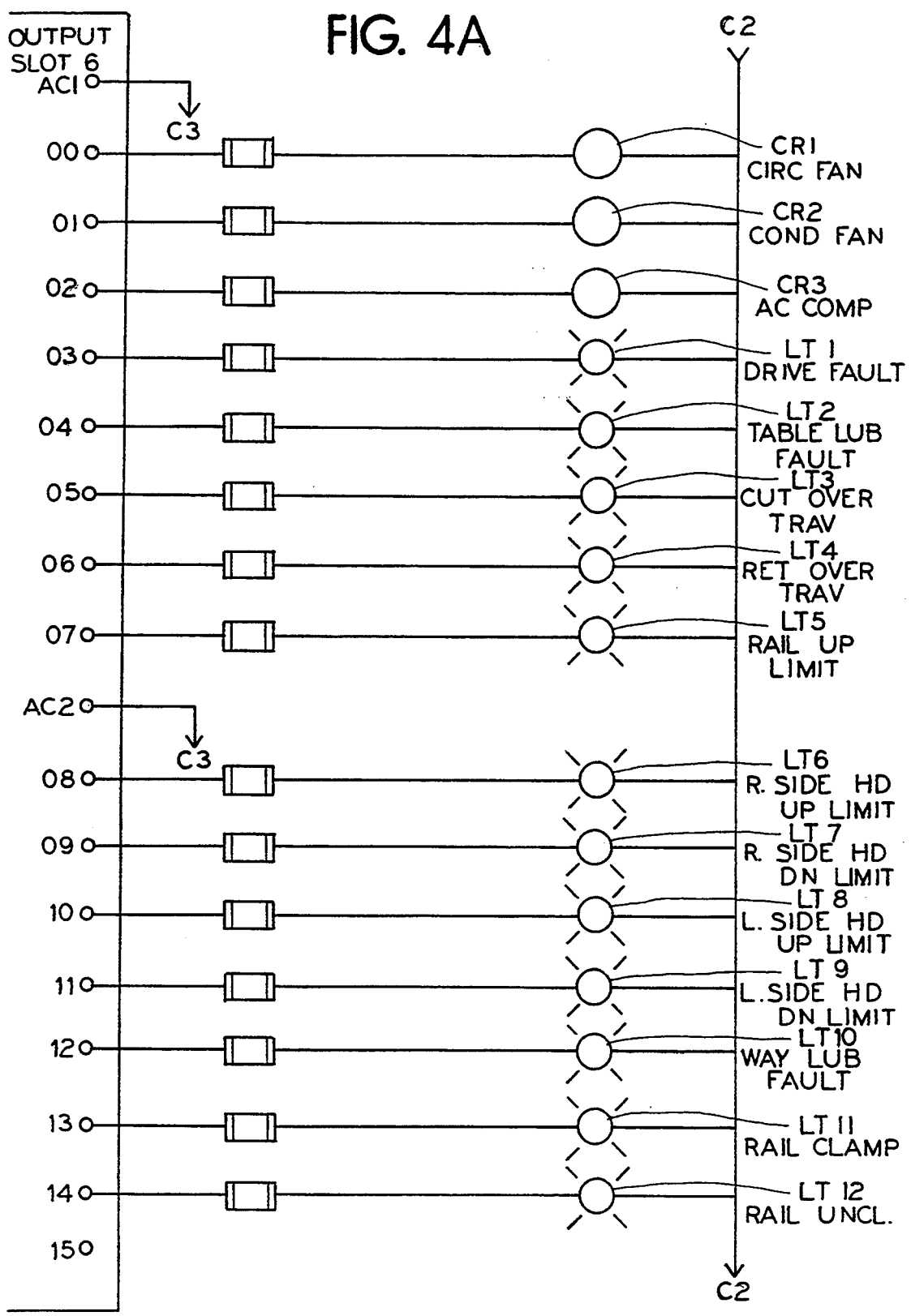
FIGS. 4A and 4B illustrate control outputs of the programmable controller of FIG. 2.
Figure 4B:
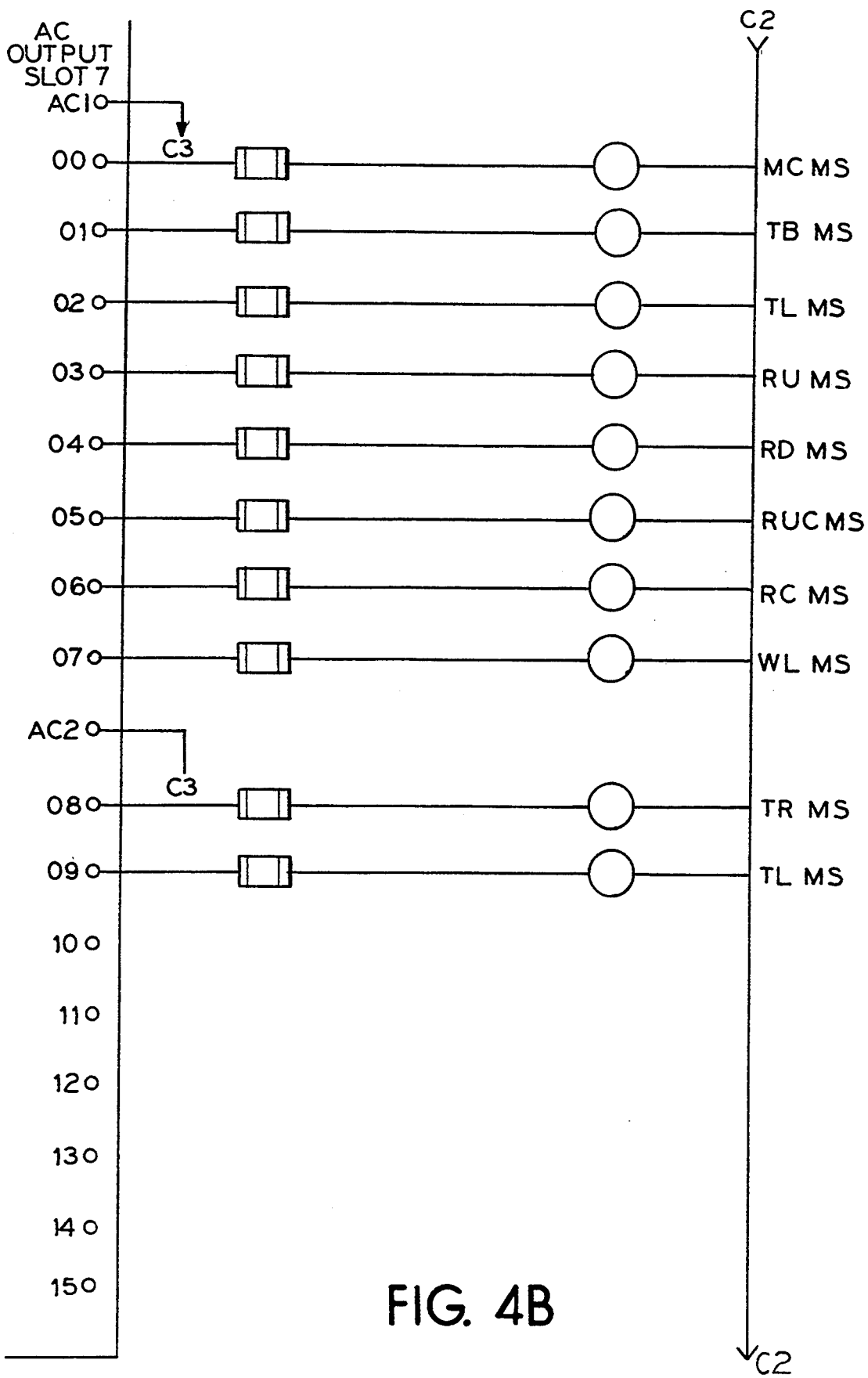

With reference now to FIGS. 4A and 4B, there is illustrated a series of output control signals and devices activated by said signals by means of which the controller 16 can communicate to the operator the status of various operating components and parameters of the control system and also by means of which the controller 16 can control operation of those various components.

In the portion of the diagram illustrated in FIG. 4A, it is illustrated that a solenoid CR1 is coupled between line C2 and output terminal 00 of slot 6. Solenoid CR1 is associated with contacts 60 of the evaporator fan 46, drive brake resistor fan 48 and drive brake resistor fan 50. Issuance of a signal by the controller 16 at terminal 00 of slot 6 will energized the solenoid CR1 thereby causing the contacts 60 to close and the fans 46, 48 end 50 to turn on. Discontinuance of the signal will turn the fans 46, 48 and 50 off.

A solenoid CR2 coupled between line C2 and output terminal 01 of slot 6 provides for turn on and turn off of the condenser fans 52 and 54. Solenoid Cr2 is associated with contacts 62 and thus issuance of a signal at terminal 01 of slot 6 by the controller 16 will cause the solenoid CR2 to be energized, thereby to cause contacts 62 to close and power to be applied to both fans 52 and 54. Conversely, discontinuance of the signal by the controller 16 will turn off the fans 52 and 54.

A solenoid CR3 coupled between line C2 and output terminal 02 of slot 6 provides for turn on and turn off of the AC compressor motor 56. Solenoid CR3 is associated with contacts 64 and thus the issuance of a signal at terminal 01 of slot 6 by the controller 16 will cause the solenoid CR3 to be energized, thereby to cause contacts 64 to close and apply power to compressor 56. Conversely, discontinuance of the signal will turn off the compressor 56.

A light emitting element LT1 coupled between line C2 and output terminal 03 of slot 6 provides a visual indication as to the operational status of the drive 10. Issuance of a signal at terminal 03 by the controller 16 will cause the light emitting element to light up thereby to inform an operator as to the status of the drive 10. In this exemplary embodiment, the light emitting element LT1 is employed to indicate occurrence of a fault in the drive 10, for example, a power failure or an internal or external fault.

A light emitting element LT2 coupled between line C2 and output terminal 04 of slot 6 provides a visual indication as to the operational status of the table lubricating pump 40. Issuance of a signal at terminal 04 by the controller 16 will cause the light emitting element to light up thereby to inform an operator as to the status of the pump 40. In this exemplary embodiment, the light emitting element LT2 is employed to indicate occurrence of a fault in the pump 40, for example, a power failure or an over pressure.

A light emitting element LT3 coupled between line C2 and output terminal 05 of slot 6 provides a visual indication as to the operational status of the travel of the cutting heads. Issuance of a signal at terminal 05 by the controller 16 will cause the light emitting element to light up thereby to inform an operator as to the status of the cutting heads. In this exemplary embodiment, the light emitting element LT3 is employed to indicate occurrence of over travel by the cutting heads, as detected by the limit switch LS1.

A light emitting element LT4 coupled between line C2 and output terminal 06 of slot 6 provides another visual indication as to the positional status of the cutting heads. Issuance of a signal at terminal 06 by the controller 16 will cause the light emitting element to light up thereby to inform an operator as to the status of the cutting heads during the return mode. In this exemplary embodiment, the light emitting element LT4 is employed to indicate occurrence of over travel by the cutting heads when returning to their home position, as detected by the limit switch LS2.

A light emitting element LT5 coupled between line C2 and output terminal 07 of slot 6 provides a visual indication as to the positional status of the rails. Issuance of a signal at terminal 07 by the controller 16 will cause the light emitting element to light up thereby to inform an operator as to the status of the rails. In this exemplary embodiment, the light emitting element LT5 is employed to indicate that the rails are up, i.e., off the table, as detected by limit switch LS7.

A light emitting element LT6 coupled between line C2 and output terminal 08 of slot 6 provides a visual indication as to the positional status of the right side cutting head. Issuance of a signal at terminal 08 by the controller 16 will cause the light emitting element to light up thereby to inform an operator as to the status of the right side cutting head. In this exemplary embodiment, the light emitting element LT6 is employed to indicate that the right side cutting head has reached its upper or right-most limit of travel, as detected by limit switch LS12.

A light emitting element LT7 coupled between line C2 and output terminal 09 of slot 6 provides a visual indication as to the positional status of the right side cutting head. Issuance of a signal at terminal 09 by the controller 16 will cause the light emitting element to light up thereby to inform an operator as to the status of the right side cutting head. In this exemplary embodiment, the light emitting element LT7 is employed to indicate that the right side cutting head has reached its lower or left-most limit of travel, as detected by the limit switch LS13.

A light emitting element LT8 coupled between line C2 and output terminal 10 of slot 6 provides a visual indication as to the positional status of the left side cutting head. Issuance of a signal at terminal 10 by the controller 16 will cause the light emitting element to light up thereby to inform an operator as to the status of the left side cutting head. In this exemplary embodiment, the light emitting element LT8 is employed to indicate that the left side cutting head is at its upper limit of travel, as detected by the limit switch LS14.

A light emitting element LT9 coupled between line C2 and output terminal 11 of slot 6 provides another visual indication as to the positional status of the left side cutting head. Issuance of a signal at terminal 11 by the controller 16 will cause the light emitting element to light up thereby to inform an operator as to the status of the left side cutting head. In this exemplary embodiment, the light emitting element LT9 is employed to indicate that the left side cutting head is at its lower limit of travel, as detected by the limit switch LS18.

A light emitting element LT10 coupled between line C2 and output terminal 12 of slot 6 provides a visual indication as to the operational status of the way lubricating pump 68. Issuance of a signal at terminal 12 by the controller 16 will cause the light emitting element to light up thereby to inform an operator as to the status of the pump 68. In this exemplary embodiment, the light emitting element LT10 is employed to indicate the occurrence of a fault in the operation of the pump 68.

A light emitting element LT11 coupled between line C2 and output terminal 13 of slot 6 provides a visual indication as to the clamping status of the rails. Issuance of a signal at terminal 13 by the controller 16 will cause the light emitting element to light up thereby to inform an operator as to the clamping status of the rails. In this exemplary embodiment, the light emitting element LT11 is employed to indicate that the rails are clamped, as detected by the limit switch LS6.

A light emitting element LT12 coupled between line C2 and output terminal 14 of slot 6 provides another visual indication as to the clamping status of the rails. Issuance of a signal at terminal 14 by the controller 16 will cause the light emitting element to light up thereby to inform an operator as to the clamping status of the rails. In this exemplary embodiment, the light emitting element LT11 is employed to indicate that the rails are unclamped, as detected by the limit switch LS5.

Referring now to FIG. 4B, various other output control signals 20 will be described. These other output control signals are provided by the controller 16 at various terminals of a slot 7.

A solenoid MC MS coupled between line C2 and output terminal 00 of slot 7 provides for closure and opening of the mains contacts MC1, MC2 and MC3. Issuance of a signal at the terminal 00 of slot 7 by the controller 16 will cause the solenoid MC MS to be energized, thereby to cause contacts MC1, MC2 and MC3 to close and power to be applied to the drive 10. Conversely, discontinuance of the signal by the controller 16 will disconnect the power from the drive 10.

A solenoid TB MS coupled between line C2 and output terminal 01 of slot 7 provides for closure and opening of the contacts 3M1, 3M2 and 3M3. Issuance of a signal at the terminal 01 of slot 7 by the controller 16 will cause the solenoid TB MS to be energized, thereby to cause contacts 3M1, 3M2 and 3M3 to close and power to be applied to the table blower motor 30. Conversely, discontinuance of the signal by the controller 16 will disconnect the power from the motor 30.

A solenoid TL MS coupled between line C2 and output terminal 02 of slot 7 provides for closure and opening of the contacts 4M1, 4M2 and 4M3. Issuance of a signal at the terminal 02 of slot 7 by the controller 16 will cause the solenoid TL MS to be energized, thereby to cause contacts 4M1, 4M2 and 4M3 to close and power to be applied to the table lubricating pump 40. Conversely, discontinuance of the signal by the controller 16 will disconnect the power from the pump 40.

A solenoid RU MS coupled between line C2 and output terminal 03 of slot 7 provides for closure and opening of the contacts 5M1, 5M2 and 5M3. Issuance of a signal at the terminal 03 of slot 7 by the controller 16 will cause the solenoid RU MS to be energized, thereby to cause contacts 5M1, 5M2 and 5M3 to close and power to be applied to the rail elevating motor 42 in such a manner to cause the motor 42 to run in its forward direction to raise the rails. Conversely, discontinuance of the signal by the controller 16 will disconnect the power from the motor 42 to terminate raising of the rails.

A solenoid RD MS coupled between line C2 and output terminal 04 of slot 7 provides for closure and opening of the contacts 5M4, 5M5 and 5M6. Issuance of a signal at the terminal 04 of slot 7 by the controller 16 will cause the solenoid RD MS to be energized, thereby to cause contacts 5M4, 5M5 and 5M6 to close and power to be applied to the rail elevating motor 42 in such a manner to cause the motor 42 to run in its reverse direction to lower the rails. Conversely, discontinuance of the signal by the controller 16 will disconnect the power from the motor 42 to terminate lowering of the rails.

A solenoid RUC MS coupled between line C2 and output terminal 05 of slot 7 provides for closure and opening of the contacts associated with the rail clamping mechanism. Issuance of a signal at the terminal 05 of slot 7 by the controller 16 will cause the solenoid RUC MS to be energized, thereby to cause those contacts to close and power to be applied to the rail clamping mechanism in such a manner to cause the rails to become unclamped. Conversely, discontinuance of the signal by the controller 16 will disconnect the power from the rail unclamping mechanism.

A solenoid RC MS coupled between line C2 and output terminal 06 of slot 7 provides for closure and opening of other contacts associated with the rail clamping mechanism. Issuance of a signal at the terminal 06 of slot 7 by the controller 16 will cause the solenoid RC MS to be energized, thereby to cause those contacts to close and power to be applied to the rail clamping mechanism in such a manner to cause the rails to become clamped. Conversely, discontinuance of the signal by the controller 16 will disconnect the power from the rail clamping mechanism.

A solenoid WL MS coupled between line C2 and output terminal 07 of slot 7 provides for closure and opening of the contacts 72. Issuance of a signal at the terminal 07 of slot 7 by the controller 16 will cause the solenoid WL MS to be energized, thereby to cause contacts 72 to close and power to be applied to the ways lubricating pump 68. Conversely, discontinuance of the signal by the controller 16 will disconnect the power from the pump 68.

A solenoid TR MS coupled between line C2 and output terminal 08 of slot 7 provides for closure and opening of the contacts 6M1, 6M2 and 6M3. Issuance of a signal at the terminal 08 of slot 7 by the controller 16 will cause the solenoid TR MS to be energized, thereby to cause contacts 6M1, 6M2 and 6M3 to close and power to be applied to the heads traverse motor 44 in such a manner to cause the motor 44 to run in its forward direction to cause the cutting heads to be raised or travel to the right, as the case may be. Conversely, discontinuance of the signal by the controller 16 will disconnect the power from the motor 44 to terminate such raising or travel of the cutting heads.

A solenoid TL MS coupled between line C2 and output terminal 09 of slot 7 provides for closure and opening of the contacts 6M4, 6M5 and 6M6. Issuance of a signal at the terminal 09 of slot 7 by the controller 16 will cause the solenoid TL MS to be energized, thereby to cause contacts 6M4, 6M5 and 6M6 to close and power to be applied to the heads traverse motor 44 in such a manner to cause the motor 44 to run in its reverse direction to cause the cutting heads to be lowered or travel to the left, as the case may be. Conversely, discontinuance of the signal by the controller 16 will disconnect the power from the motor 44 to terminate such lowering or travel of the cutting heads.

The requirements for these various components are well known and need not be repeated herein. For example, the degree of lubrication, etc., required for the ways, i.e., the rails, should be sufficiently self-evident.

Figure 5:
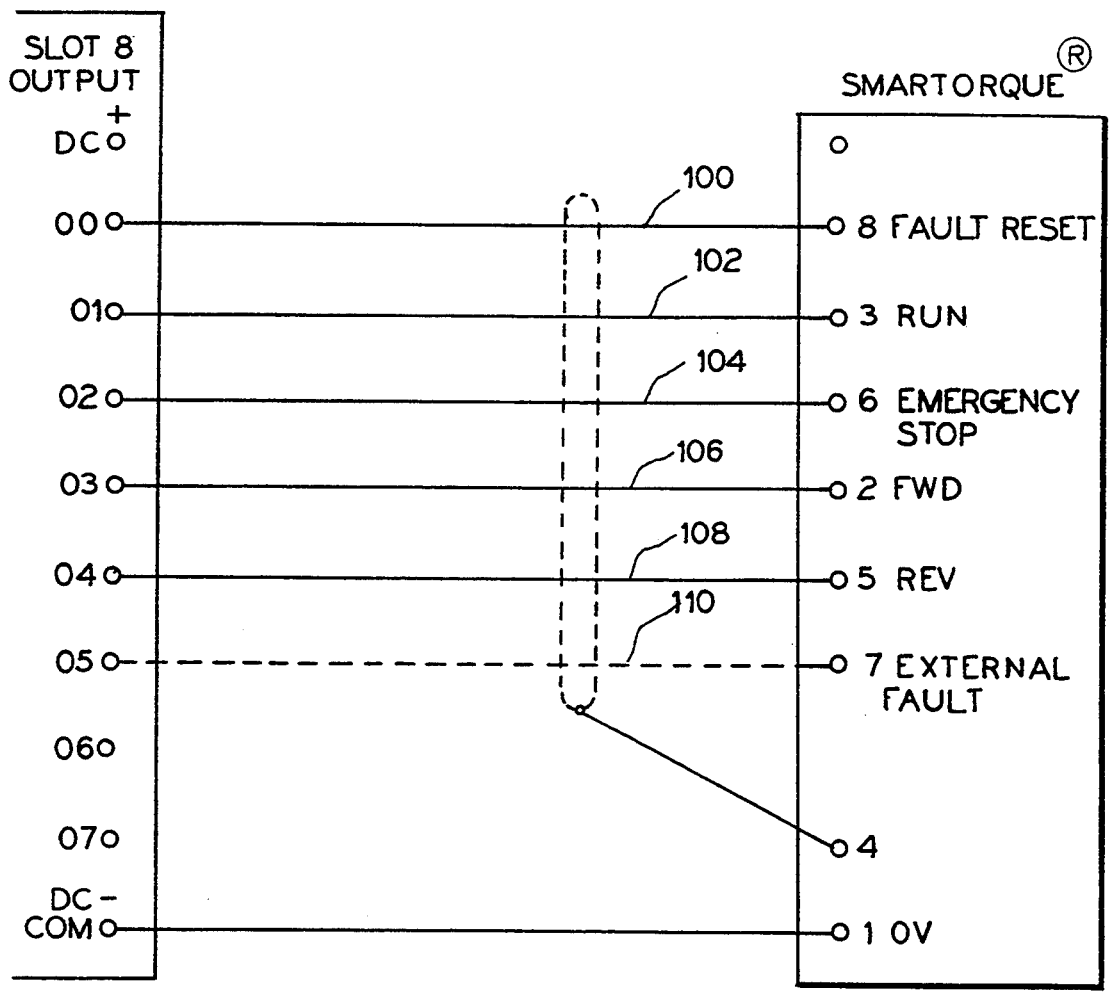
FIG. 5 illustrates interconnections between a controller and a motor driver of FIG. 1.

Also provided as outputs from the programmable controller 16 are a series of DC signal inputs to the adjustable frequency driver 10. These outputs are illustrated in FIG. 5 and include signals such as a FAULT RESET signal over line 100 coupled between terminal 00 of seat 8 over terminology of the driver 10; a RUN command over line 102 coupled between terminal 01 of slot 8 and terminal 03 of the driver 10; an EMERGENCY STOP or base block command over line 104 coupled between terminal 02 of slot 8 and terminal 06 of the driver 10; a FORWARD direction command over line 106, a REVERSE motor command over line 108 coupled between terminal 04 of slot 8 and terminal 05 of the driver 10 and an EXTERNAL FAULT signal command over line 110 coupled between terminal 05 of slot 8 and terminal 07 of the driver 10.

The RESET signal is used to reset the operation of the driver 10, e.g., upon power fault of the system.

The RUN signal is used to communicate to the driver 10 the speed at which the planer motor 14 is to run. To that end, the RUN signal in essence is the speed signal selected by the programmable controller 16.

The functions of the FORWARD and REVERSE signals are self-explanatory, i.e., they cause the motor 14 to run in a forward or reverse direction. Likewise, the function of the EMERGENCY STOP signal is self evident. The transmission of this signal cause an immediate shut down of the motor 14.

The EXTERNAL FAULT signal is employed by the system to reset the driver 10 whenever a fault is encountered during operation of the controller 16.

A shield or forward wire is coupled to terminal 04 of the driver 10. The speed signals board 22 as described above is employed to generate a plurality of selectable signals that in turn are used to drive the motor 14 at various speeds.

Figure 6:
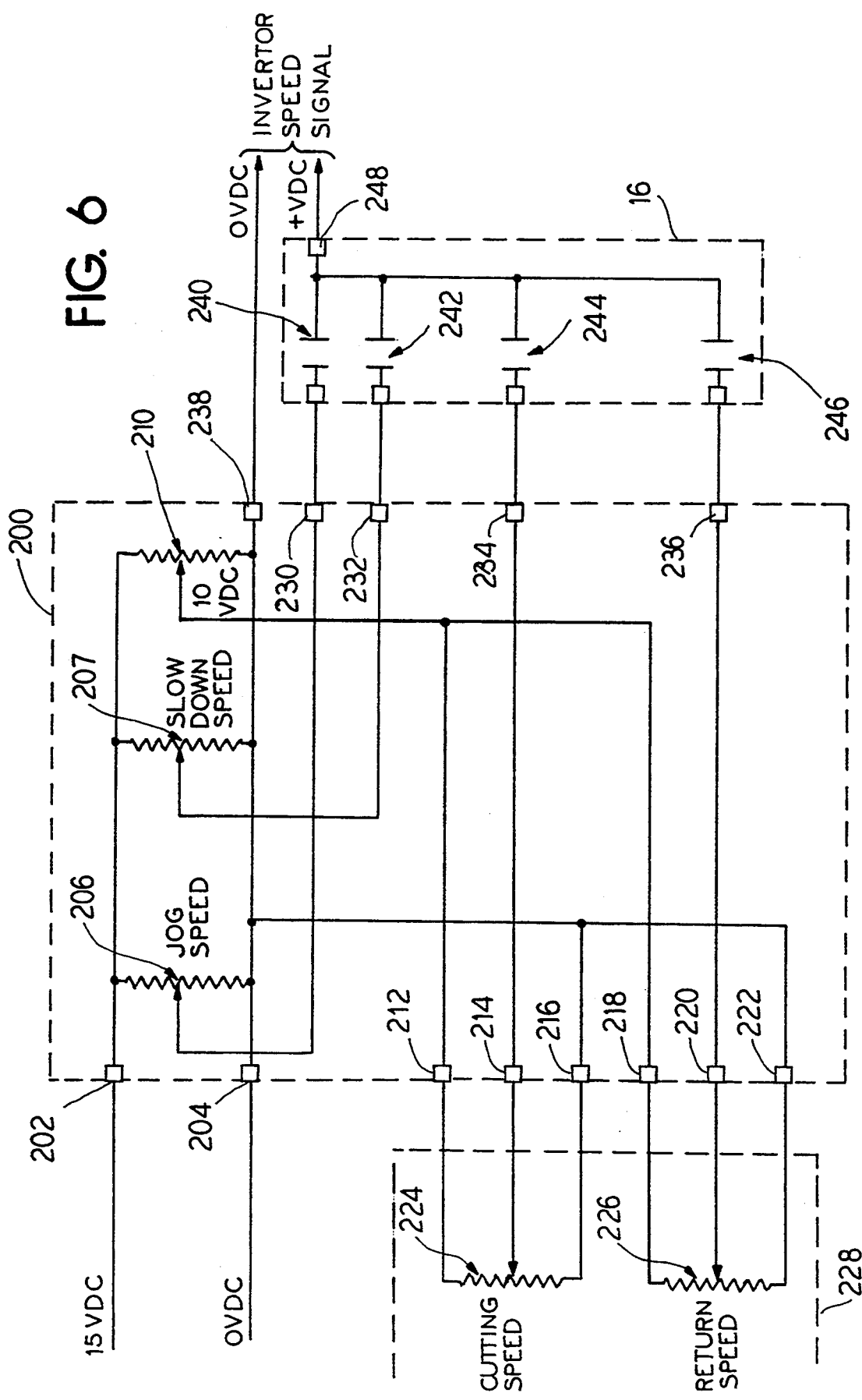
FIG. 6 illustrates a speed signals board used in the system of FIG. 1.

In FIG. 6, a speed signals board 200 is illustrated which includes a pair of input terminals 202 and 204 by means of which a 15 volt DC signal is received by the board 200. Coupled across these terminals 202 and 204 are three potentiometers 206, 208 and 210. The potentiometer 206 serves to establish a jog speed as hereinafter described. The potentiometer 208 serves to establish a slow-down speed as hereinafter described. The potentiometer 210 serves to establish a 10 volt DC potential, by voltage division, for purposes hereinafter described.

Also coupled to the board 200 via appropriate terminals 212, 214 and 216 and 218, 220 and 222, respectively, are two control potentiometers 224 and 226. The potentiometer 224 is used to establish a cutting speed and preferably is provided in a pendent control box 228 located on or near the machine 15. Potentiometer 226 is used to establish the return speed and preferably also is provided in the pendent control box 228.

The board 200 is provided with four outputs 230, 232, 234 and 236 at which the four above described speed signals are made available for selection by the programmable controller 16.

As illustrated, an additional output terminal 238 is coupled directly to the ground reference of the 15 volt DC source so as to provide a reference output ground.

Then, each of the output terminals 230, 232, 234 and 236 are coupled to terminals of a slot 9 of the controller 16 which in turn are coupled to normally open contacts 240, 242, 244, and 246, respectively, controlled by the controller 16. The contacts 240, 242, 244 and 246 are commonly coupled to the speed signal input 102 of the driver 10 via the output terminal 01 of slot 8 such that the selected closure of one of the contacts 240, 242, 244 or 246 causes transmission of its associated speed signal to the driver 10.

As also illustrated, the various potentiometers 206, 208, 210, 224 and 226 are coupled such that the output of the jog speed potentiometer 206 is coupled to the output terminal 01 via controller 16 controlled normally open contact 240. Thus, the jog speed signal is a DC signal whose voltage is a settable fraction of that of the 15 volt DC input signal.

Similarly, the variable output of the slow-down potentiometer 208 is coupled to output terminal 01 of slot 8 via controller 16 controlled normally open contact 242. Thus, the slow-down speed is a DC signal whose voltage is a settable fraction of the 15 volt DC input signal.

Both potentiometers 224 and 226 are coupled across the reference ground terminal 238 and the variable output tap of the 10 volt DC potentiometer 210. Thus, each potentiometer 224 and 226 in essence is coupled across a 10 volt DC signal source.

The variable output tap of the potentiometer 224 is coupled to the output terminal 01 of slot 8 via controller 16 controlled normally open contact 244 while the variable output tap of the return speed potentiometer 226 is coupled to the output terminal 246 via controller 16 controlled normally open contact 246. It can be appreciated that in view of this arrangement, an operator is able to adjust the cutting and return speeds as desired between no speed and a top speed pre-established by the setting of the 10 VDC potentiometer 210.

A presently preferred control algorithm or program written for the controller 16 is reproduced in the appendix hereto. All copyrights are reserved in such work in the assignee of this application.

As can be appreciated from the program presented in the appendix, the controller 16 is programmed to recognize the states of the various control signal inputs 18 and to react accordingly to control or provide one or more of the control output signals 20 described above as needed. Importantly, the controller also selects which of the speed signals 20 is provided by the speed signal separator board 200 to the driver 10.

Although modifications and changes may be suggested by those skilled in the art, it is the intention of the inventors to embody within the patent warranted hereon all changes and modifications as reasonably and properly come within the scope of their contribution to the art.

I claim:

1. A motor control system comprising:
an adjustable frequency driver coupled between a motor and power supply, the adjustable frequency driver controlling speed of the motor in response to speed signals supplied to the adjustable frequency driver, the adjustable frequency driver controlling the motor by controlling application of a square wave signal to the motor;
a programmable controller coupled to the driver and operative to control the driver by supplying the speed signals thereto;
a set of control signals coupled to the programmable controller, the programmable controller being programmed to be responsive to the control signal; and
the programmable controller being programmed to select, in response to the control signals, one of the speed signals and causing the same to be transmitted to the driver for controlling the speed of the motor.

2. The motor control system of claim 1, wherein the motor is an AC induction motor.

3. The motor control system of claim 1, wherein the adjustable frequency driver is configured to generate a motor control signal comprising a variable phase and variable frequency square wave signal.

4. The motor control system of claim 1, wherein the set of selectable speed signals comprises at least four different signals.

5. The motor control system of claim 4, wherein the different speed signals are direct current signals of different voltages.

6. A planer motor control system comprising:
an adjustable frequency driver coupled between a planer motor and a power supply, the adjustable frequency driver controlling speed of the motor in response to speed signals supplied to the adjustable frequency driver, the adjustable frequency driver controlling the motor by controlling application of a square wave signal to the motor;
a programmable controller coupled to the adjustable frequency driver and operative to control the adjustable frequency driver, by supplying the speed signals thereto;
a set of control signals coupled to the programmable controller, the programmable controller being programmed to be responsive to the control signals; and
a set of selectable speed signals coupled to the programmable controller, the programmable controller being programmed to select, in response to the control signals, one of the speed signals of the set and causing the same to be transmitted to the adjustable frequency driver for controlling the speed of the planer motor.

7. The motor control system of claim 6, wherein the motor is an AC induction motor.

8. The motor control system of claim 6, wherein the adjustable frequency driver is configured to generate a motor control signal comprising a variable phase and variable frequency square wave signal.

9. The motor control system of claim 6, wherein the set of selectable speed signals comprises at least four different signals.

10. The motor control system of claim 9, wherein the different speed signals are direct current signals of different voltages.

11. A planer having a motor and a control system therefor, comprising:
an adjustable frequency driver coupled between the motor and a power supply, the adjustable frequency driver controlling speed of the motor in response to speed signals supplied to the adjustable frequency driver, the adjustable frequency driver controlling the motor by controlling application of a square wave signal to the motor;
a programmable controller coupled to the driver and operative to control the adjustable frequency driver by supplying the speed signals thereto;

a set of control signals coupled to the programmable controller, the programmable control being programmed to be responsive to the control signals; and a set of selectable speed signals coupled to the programmable controller, the programmable controller being programmed to select, in response to the control signals, one of the speed signals of the set and causing the same to be transmitted to the driver for controlling the speed of the motor.

12. The motor control system of claim 11, wherein the motor is an AC induction motor.

13. The motor control system of claim 11, wherein the adjustable frequency driver is configured to generate a motor control signal comprising a variable phase and variable frequency square wave signal.

14. The motor control system of claim 11, wherein the set of selectable speed signals comprises at least four different signals.

15. The motor control system of claim 14, wherein the different speed signals are direct current signals of different voltages.

* * * * *

UNITED STATES PATENT AND TRADEMARK OFFICE
CERTIFICATE OF CORRECTION

PATENT NO. : 5,444,344
DATED : August 22, 1995
INVENTOR(S) : Irwin Vincent

It is certified that error appears in the above-indentified patent and that said Letters Patent is hereby corrected as shown below:

Column 9, line 64      "cite" should read --side--.

Column 17, line 2      "control" should read --controller--.

Signed and Sealed this

Twenty-first Day of May, 1996

Attest:

BRUCE LEHMAN

*Attesting Officer*      *Commissioner of Patents and Trademarks*